United States Patent
Chen et al.

(10) Patent No.: US 7,574,624 B2
(45) Date of Patent: Aug. 11, 2009

(54) INTEGRATED TEST METHOD ON MULTI-OPERATING SYSTEM PLATFORM

(75) Inventors: Town Chen, Tianjin (CN); Kai Wang, Tianjin (CN); Tom Chen, Taipei (TW); Win-Harn Liu, Taipei (TW)

(73) Assignee: Inventec Corporation, Taipei (TW)

( * ) Notice: Subject to any disclaimer, the term of this patent is extended or adjusted under 35 U.S.C. 154(b) by 424 days.

(21) Appl. No.: 11/707,871

(22) Filed: Feb. 20, 2007

(65) Prior Publication Data
US 2008/0201610 A1 Aug. 21, 2008

(51) Int. Cl.
*G06F 11/00* (2006.01)
(52) U.S. Cl. ............................ 714/36; 714/47
(58) Field of Classification Search ............. 714/36, 714/47, 25
See application file for complete search history.

(56) References Cited

U.S. PATENT DOCUMENTS

| | | | |
|---|---|---|---|
| 6,543,047 B1 * | 4/2003 | Vrhel et al. ............ 717/121 |
| 6,785,844 B2 * | 8/2004 | Wong et al. ............ 714/25 |
| 6,865,691 B1 * | 3/2005 | Brundridge et al. ...... 714/25 |
| 7,134,049 B2 * | 11/2006 | Gillenwater et al. ...... 714/25 |
| 7,409,536 B2 * | 8/2008 | Guo et al. ............. 713/1 |
| 7,451,349 B2 * | 11/2008 | Tsai et al. ............. 714/27 |
| 2003/0115443 A1 * | 6/2003 | Cepulis et al. .......... 713/2 |
| 2005/0108512 A1 * | 5/2005 | Blouin et al. ........... 713/1 |
| 2005/0193261 A1 * | 9/2005 | Carr ................... 714/36 |
| 2007/0168728 A1 * | 7/2007 | Blouin et al. ........... 714/25 |
| 2008/0046708 A1 * | 2/2008 | Fitzgerald et al. ........ 713/2 |
| 2008/0215931 A1 * | 9/2008 | Boss et al. ............. 714/57 |

* cited by examiner

*Primary Examiner*—Marc Duncan
(74) *Attorney, Agent, or Firm*—Rabin & Berdo, P.C.

(57) ABSTRACT

An integrated test method on a multi-operation system (OS) platform for performing an integrated test of a file system and disk performance in a computer with an extended firmware interface (EFI) system environment on multiple OS platforms is provided. The method includes the following steps. Scan sectors of an entire physical hard disk and perform a hardware underlying test of a disk device in the EFI environment; select and load an OS, then enter the OS environment to test the file system and the disk performance in the system environment; exit from the OS and return to the EFI environment to summarize a test result; determine whether it is necessary to load other OSes, if necessary, return and load other OSes, and if not, send the summarized test result to a server terminal for analysis and processing.

5 Claims, 1 Drawing Sheet

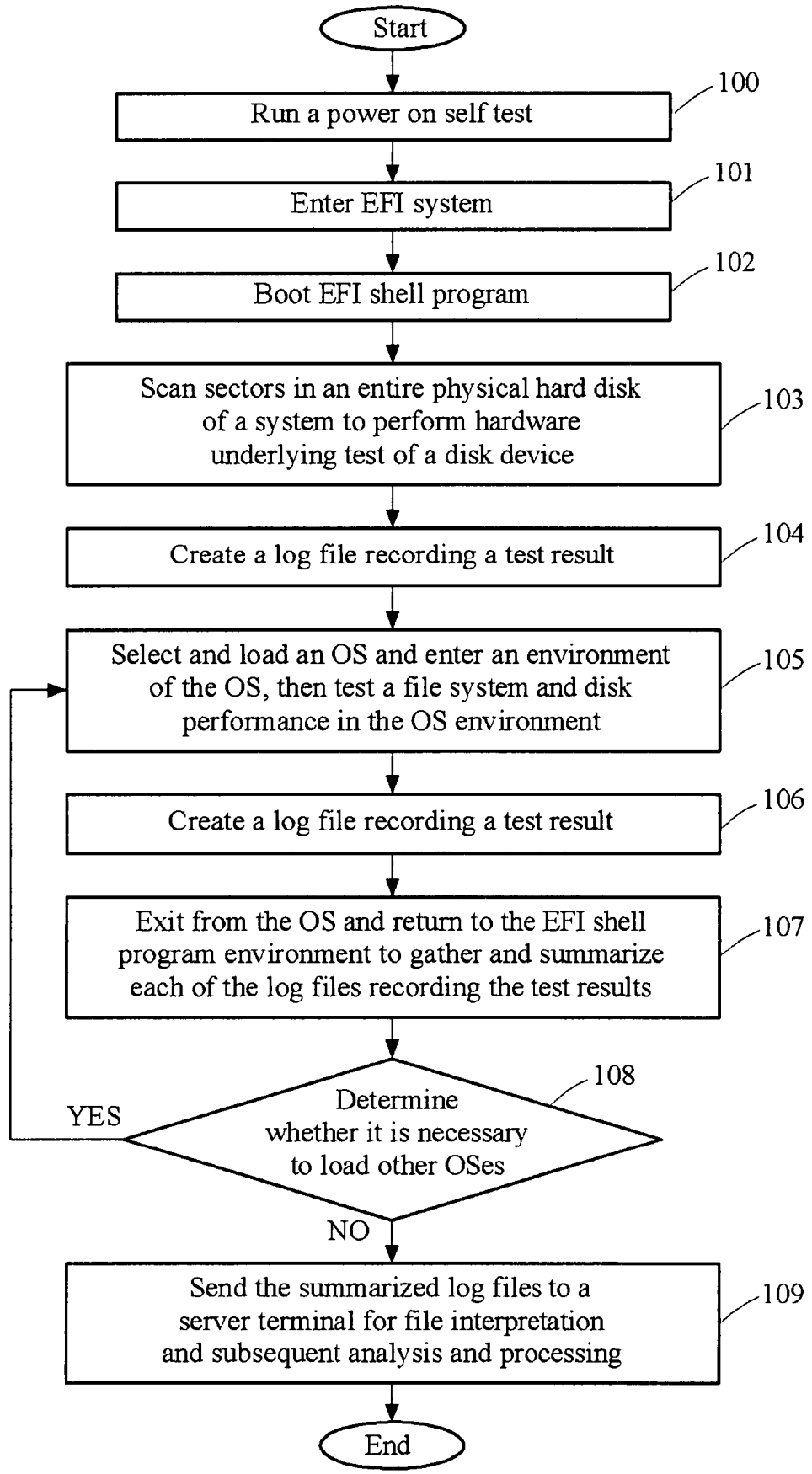

INTEGRATED TEST METHOD ON MULTI-OPERATING SYSTEM PLATFORM

BACKGROUND OF THE INVENTION

1. Field of Invention

The present invention relates to a method of testing hardware devices in a system on a multi-operating system (multi-OS) platform, and more particularly, to a method of performing integrated tests on a file system and an underlying hardware and disk performance of a disk device on a multi-OS platform in a computer which has an Extended Firmware Interface (EFI) system environment.

2. Related Art

At present, when a system tester performs a diagnostic test on a hardware device such as a disk, for different OS test platforms such as Windows, Linux, or Dos, the test focuses on a different aspect to each OS platform because of the differences of the OSes. As the security level of the Windows system is higher and higher, it is difficult to perform underlying hardware functional tests for all hardware devices in the Windows system environment. Therefore, in the Windows system environment, the tester inclines to place the test focus on applications and performance such as the File System test and the Central Processing Unit (CPU) utilization test. In addition, Linux, Dos and EFI systems are a kind of new micro OS platform, which intends to replace the existing Basic Input Output System (BIOS, which can be used to realize an initialization and relevant configuration of the system hardware) platform to realize the startup and boot of the OS. Moreover, the EFI also provides improved and more comprehensive functions than the conventional BIOS does, as the EFI is equivalent to a mini OS, and features similar hardware openness as the Linux system (a free multi-user OS that can run in a normal personal computer). Because the EFI and BIOS are at a same level, the EFI is closer to the hardware layer, through which the tester can completely control the hardware such as the disk, and perform functional tests of hardware level. Besides, as the EFI supports the C/C++ programming language, the tester can easily complete more tests on the underlying hardware functions through an EFI shell program (an EFI shell program relates to an interface program provided by the EFI for communication with an external operator). At the same time, through compiling programs, the tester can also load various OSes and enter corresponding system environments to complete different system test processes and test functions for logic testing in the EFI environment. Because the system environment has better hardware openness, the tester can do more underlying functional tests for the hardware. Aiming at different characteristics of different OSes, the tester needs to continually reboot the computer equipment to respectively enter different OSes and do tests, which increases the complexity of the tests and the workload of the tester, and extends the test time. Furthermore, because the test focus in every OS platform is not totally the same, if the tests are done in only one OS environment, the coverage rate of the tests may be not large enough, so the hardware cannot be tested comprehensively and completely, reducing the accuracy of the test result.

SUMMARY OF THE INVENTION

In order to solve the aforementioned problems and defects of the conventional art, the present invention is directed to an integrated test method on a multi-OS platform for performing comprehensive and integrated tests of a file system and disk performance on a multi-OS platform in a computer with an EFI system environment.

The integrated test method on a multi-OS platform of the present invention includes the following steps. (a) Start an EFI shell program after a computer runs a power on self test and enters an EFI system; (b) scan sectors of an entire physical hard disk of a system in the EFL shell program environment, so as to perform a hardware underlying test of a disk device; (c) create a log file recording a test result after the hardware underlying test; (d) select and load an OS and enter an environment of the OS, then test the file system and the disk performance in the OS environment; (e) create a log file recording a test result after the test; (f) exit from the OS and return to the EFI shell program environment to gather and summarize each of the log files recording the test results; and (g) determine whether it is necessary to load other OSes, if necessary, return to step (d), and if not, send the summarized log files to a server terminal for file interpretation and subsequent analysis and processing.

To sum up, the present invention has the following advantages.

The integrated test method a multi-OS platform of the present invention can integrate a plurality of OS platforms, and test hardware devices in a computer such as a disk through comprehensively using characteristics of each of the OS platforms, so as to realize the overall tests from device functions to application performance of hardware devices such as the disk. For example, it is more appropriate to perform upper layer application and performance tests on the Windows OS platform, while is more appropriate to do underlying hardware functional test on EFI, Linux, and Dos OS platforms. Thus, the coverage rate of the test is improved greatly, and the accuracy of the test result increase is improved significantly.

At the same time, the present invention realizes an automatic switch between different OS platforms for tests and test configuration scripts, and automatically complete corresponding test programs without requiring external or manual interference during a test process. Thus, the complicated test process is simplified, the test time is shortened, the workload of the tester is reduced, and unnecessary negative influence brought about by manual operation is lessened.

Besides, the integrated test method on a multi-OS platform of the present invention increases the flexibility and configurability of the test through different OS booting configuration and test item configuration. At the same time, the method of the present invention can gather and summarize test results of a plurality of OS platforms, for example, create a synthetic log file, which includes an information of the synthetic test result of the hardware functional test and application performance test. Then the log file is sent to a server terminal through Internet for file interpretation and subsequent analysis and processing. Thus, the information of the hardware devices is shown more comprehensively and directly, which is convenient for the tester to analyze problems and performance of the hardware devices.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The sole FIGURE is a flow chart of an integrated test method on a multi-OS platform of the present invention.

DETAILED DESCRIPTION OF THE INVENTION

In the following description, a detailed illustration according to a preferred embodiment of the present invention is provided with reference to the drawings.

The FIGURE is a flow chart of an integrated test method on a multi-OS platform of the present invention. As shown in the FIGURE, the integrated test method on a multi-OS platform of the present invention includes the following steps.

Start an EFI shell program (step 102) after a computer runs a power on self test (step 100) and enters an EFI system (step 101).

Scan all sectors in an entire physical hard disk of a system in the EFL shell program environment for performing a hardware underlying test for a disk device (step 103).

Create a log file recording a test result after the hardware underlying test (step 104).

Select and load an OS and enter an environment of the OS, then test a file system in the OS environment and disk performance in the OS environment (step 105). The method of the present invention provides a set of integrated test programs on the multi-OS platform in the EFI shell program environment, and also provides a user with a configurable interface. The user can freely configure to boot which OS platform, determine a boot sequence, and define a process and logic of the test. Then, according to the configuration of the user, the integrated test platform program automatically loads, boots and enters different OS test platforms (different disk partitions can be loaded in the EFI shell program environment for visiting different OS partitions), and completes test functions of different system test processes and test logic. The method of the present invention is realized in the EFI shell program environment that provides powerful functions, and a system tester can compile applications and drivers in the EFI shell program environment. Therefore the above functions can be realized. Moreover, because BIOS is replaced by the EFI, that is to say, the tester does the test at the BIOS level, the tester has more freedom. For example, the tester can select to load and boot a plurality of OS platforms (including Windows OSes of all versions, even the latest Windows Vista OS, the Linux OS, the Dos OS and so on), which can not be realized in conventional art.

Create a log file recording the test result after the test (step 106).

Exit from the OS and return to the EFI shell program environment to gather and summarize the log files recording the test results (step 107). The integrated test platform program will automatically gather the log files recording the relevant test results created on each of OS test platforms and according to each of the test logics, and summarize the log files into a synthetic log file.

Determine whether it is necessary to load other OSes (step 108). If necessary, return to step 105. If not, send the summarized log file to a server terminal for file interpretation and subsequent analysis and processing of the log file (step 109).

Moreover, additional illustration to the present invention is as follows. Because the function of the EFI is equivalent to that of the BIOS, the EFI will do tasks done by the BIOS formerly, and provide more powerful function at the same time. For example, all sectors of a system disk can be visited in the EFI environment, and the EFI will reserve an area of the system disk for self operation and data storage. However, in the Windows and Linux environments, the sectors reserved by the EFI cannot be visited, nor can the tester visit or modify all sectors of the disk. For example, in the Windows Vista system environment the protection on partition C (the system disk) is stricter, in which certain folders can not be visited, and even an operation of reading is considered as illegal. Therefore, through the method of the present invention the tester can combine the EFI test program with the test in the Windows system environment to perform mixed tests on a multi-OS platform.

To sum up, through using the test process according to the method of the present invention, the system tester can realize the comprehensive and overall test of the system hard disk device from underlying to upper layers, from the inspection of the disk hardware and the scanning of the sectors to the test of the file system and the inspection of the disk performance on various OS platforms, breaking the restriction of the OS platforms in the conventional art. Furthermore, the test method of the present invention is integrated, and the test process of the method is considered as a whole without manual interference. Thus the characteristics of the OS platforms are integrated, and a comprehensive and complete test is realized. On the contrary, in the conventional art if the tester wants to complete such a test, the scripts must be configured manually, and different OSes must be selected and booted manually and individually to complete the test at different levels.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An integrated test method on a multi-operating system (OS) platform, for realizing a synthetic test of a file system and disk performance on multiple OS platforms in a computer with an extended firmware interface (EFI) system environment, the method comprising:
   (a) booting an EFI shell program after the computer runs a power on self test and enters the EFI system;
   (b) scanning sectors in an entire physical hard disk in the EFI shell program environment, and performing a hardware underlying test of a disk device;
   (c) creating a log file recording a test result after the hardware underlying test;
   (d) selecting and loading an OS and entering an environment of the OS, then testing a file system and a disk performance in the OS environment;
   (e) creating a log file recording a test result after the test;
   (f) exiting from the OS and returning to the EFI shell program environment to gather and summarize each of the log files recording the test results; and
   (g) determining whether it is necessary to load other OSes, if necessary, returning to step (d), and if not, sending the summarized log files to a server terminal for file interpretation and subsequent analysis and processing.

2. The integrated test method in a multi-OS platform as claimed in claim 1, wherein step (g) is to send the summarized log files to a server terminal for file interpretation and subsequent analysis and processing through an Internet.

3. The integrated test method in a multi-OS platform as claimed in claim 1, wherein the OS is a Windows OS.

4. The integrated test method in a multi-OS platform as claimed in claim 1, wherein the OS is a Linux OS.

5. The integrated test method in a multi-OS platform as claimed in claim 1, wherein the OS is a DOS OS.

* * * * *